(12) United States Patent
Piccioni

(10) Patent No.: US 9,403,710 B2
(45) Date of Patent: Aug. 2, 2016

(54) ONE-PIECE DIE MOLD FOR MOLDING A GLASS ARTICLE, SUCH AS A SALAD BOWL OR A SIMILAR CONTAINER, HAVING AT LEAST ONE THROUGH HOLE, ASSOCIATED MANUFACTURING EQUIPMENT AND CORRESPONDING MOLDING PROCESS

(71) Applicant: VETRERIA DI BORGONOVO S.P.A., Milan (IT)

(72) Inventor: Pier Francesco Piccioni, Castelsangiovanni (IT)

(73) Assignee: Vetreria Di Borgonovo S.p.A., Milan (IT)

( * ) Notice: Subject to any disclaimer, the term of this patent is extended or adjusted under 35 U.S.C. 154(b) by 493 days.

(21) Appl. No.: 13/954,451

(22) Filed: Jul. 30, 2013

(65) Prior Publication Data
US 2014/0072737 A1    Mar. 13, 2014

(30) Foreign Application Priority Data
Sep. 10, 2012    (IT) .............................. MI2012A1497

(51) Int. Cl.
| C03B 11/02 | (2006.01) |
| C03B 11/10 | (2006.01) |
| A45B 25/24 | (2006.01) |
| C03B 23/04 | (2006.01) |

(52) U.S. Cl.
CPC ................. *C03B 11/10* (2013.01); *A45B 25/24* (2013.01); *C03B 11/02* (2013.01); *C03B 23/04* (2013.01); *Y10T 428/131* (2015.01)

(58) Field of Classification Search
CPC ........ C03B 11/10; C03B 11/02; C03B 23/04; A45B 25/24; Y10T 428/131
See application file for complete search history.

(56) References Cited

FOREIGN PATENT DOCUMENTS

CN    202408140    * 9/2012    ............. A47G 19/02

* cited by examiner

*Primary Examiner* — Michael C Miggins
(74) *Attorney, Agent, or Firm* — Notaro, Michalos & Zaccaria P.C.

(57) ABSTRACT

Mold for manufacturing glass containers such as salad has at least one through hole through their walls with three distinct parts; a die defining the outer shape of the container adapted to receive a gob of glass in a plastic state; a plunger, the inner shape of the container to be molded; and a closing ring. The three parts are pressed onto one another to cause pressing and expansion of the glass gob in the cavity of the mold. The die has a monolithic construction of one piece, and the closing ring and the one-piece die have at least one protruding portion defining the shape of the through hole to be molded and formed in the container.

9 Claims, 7 Drawing Sheets

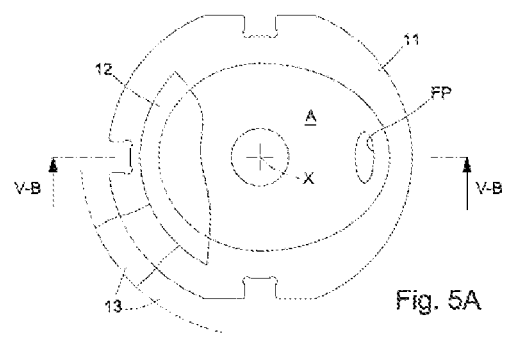
Fig. 5A
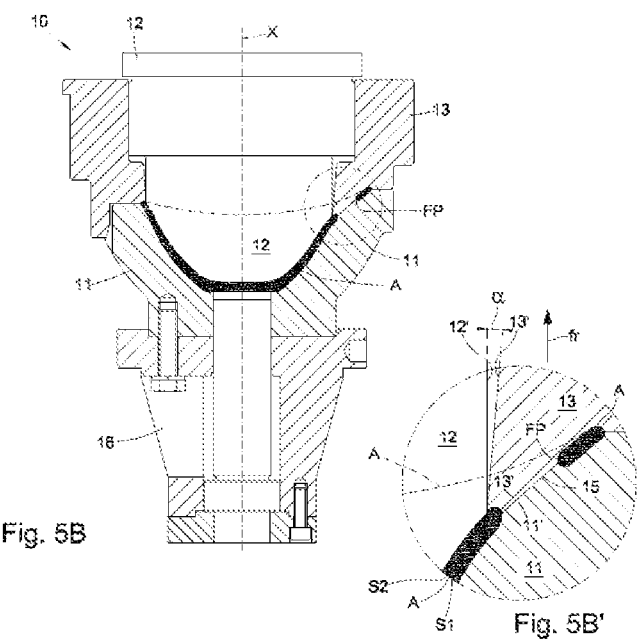
Fig. 5B
Fig. 5B'

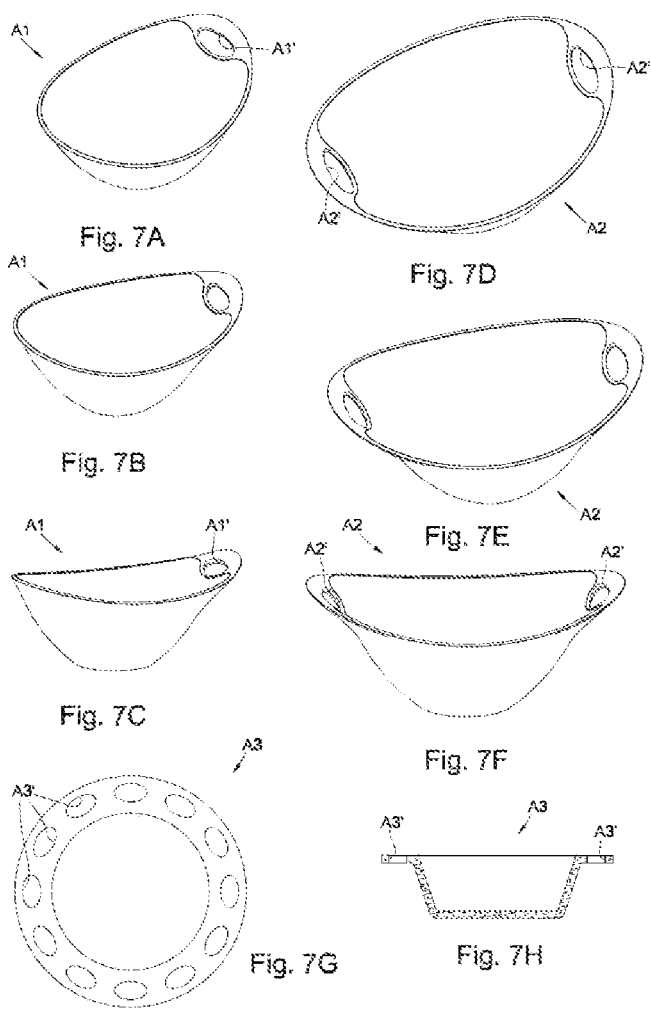

ONE-PIECE DIE MOLD FOR MOLDING A GLASS ARTICLE, SUCH AS A SALAD BOWL OR A SIMILAR CONTAINER, HAVING AT LEAST ONE THROUGH HOLE, ASSOCIATED MANUFACTURING EQUIPMENT AND CORRESPONDING MOLDING PROCESS

FIELD OF THE INVENTION

The present invention generally concerns the field of glassware fabrication and molding, and more particularly relates to a new molding station or mold for molding glass articles, i.e. salad containers, bowls, or similar containers, whose shape has at least one through aperture or hole or bore formed through the thickness of the walls of the article or container.

The present invention also relates to a corresponding manufacturing equipment and a corresponding process for fabricating and molding glass articles, typically containers such as salad bowls or the like, which have at least one through hole or bore formed in their walls.

BACKGROUND OF THE INVENTION AND PRIOR ART

In the field of fabrication and molding of glass articles and products a molding station is known to use special molds composed of multiple parts, which are adapted to receive a glass gob in a plastic or molten state for molding the article.

Particularly, the gob is deposited on a part of the mold, known as die, which usually defines the outer shape of the article or glass container to be molded.

The mold also comprises a second part, known as plunger, which defines the inner shape of the article or glass container to be molded, wherein during molding such second part or plunger closes against the die containing the gob, to cause expansion thereof in the gap formed by the die and the plunger.

Also the mold may comprise one or more additional parts that are designed to close against one another in combination with the die and the plunger, to close and completely seal the mold, such that the inner cavity of the mold will assume a shape that exactly matches the shape of the glass article to be molded.

Therefore, when the mold is closed, the glass gob that was initially deposited in the die is pressed and expands to entirely fill the mold cavity and form the article.

Of course, the shape and mutual arrangement of the various parts of the mold will change according to the particular configuration and exterior appearance of the glass article to be molded.

In short, these parts of the mold are designed and controlled to close upon one another, as mentioned above, to close the mold and form the article, and later separate from one another to allow removal of the molded glass article from the mold.

The die that defines the outer shape of the glass article to be molded is usually composed of two mating parts that close upon each other to form the inner cavity of the mold and separate from each other, once the glass article has been molded, to allow removal of the glass article.

For better clarity, FIG. 9 schematically shows the structure and basic parts of a typical conventional mold, referenced ST, which is used in a molding station SS, to mold a glass article AV, e.g. consisting of a container such as a salad bowl or the like.

Particularly, this conventional mold ST is essentially composed of a plurality of distinct and mutually separable parts or pieces, referenced P1, P2, P3, P4.

More in detail, the pieces P1 and P2 compose the die of the mold ST, also designated as MAT, and form a concave surface SUP' in their mutually closed state, which corresponds with and defines the outer shape of the glass article AV, to be molded.

The piece P3, i.e. the plunger, defines in turn a convex surface SUP" which corresponds to and defines the inner shape of the glass article AV, to form a gap with the concave surface SUP' of the die MAT, when the plunger P3 is closed thereupon, said gap corresponding to the wall of the article AV to be molded and setting its thickness.

Finally, the piece P4 has a general ring shape, and is designed to close upon the die MAT to laterally close the gap between the plunger, i.e. the piece P3 and the die MAT of the mold ST, and form the inner cavity of the mold ST with the other pieces.

When the glass article AV is molded using this conventional mold ST, the two pieces P1 and P2 are closed against each other to form the die MAT, as shown by arrows f.

Then, as shown in section (a) of FIG. 9, a glass gob V in a plastic or molten state is deposited into the die MAT formed by the pieces P1 and P2.

Later, the upper part P3, i.e. the plunger, is closed with the ring-shaped piece P4 upon the die MAT formed by the pieces P1 and P2, as shown by arrows f' and in section (b) of FIG. 9, to press the glass gob V and cause deformation and expansion thereof in the gap between the die MAT and the plunger P3, to fill the whole inner cavity of the mold ST, thereby forming the glass article AV.

Finally, the parts of the mold ST are moved apart from each other, as shown by arrows f" and in section (c) of FIG. 9, for removal of the glass article AV from the mold ST.

A need is also known to arise in the field of glassware fabrication and molding, for the possibility of manufacturing and fabricating glass articles with a configuration characterized by one or more through holes, and apertures in general, formed through their walls.

This need has been generally addressed, in the prior art, by the design and construction of special molds whose parts are configured and appropriately controlled to define these holes and these apertures during molding and formation of the glass article.

Nevertheless, the molds and molding equipment that are currently available in the prior art for molding glass articles having one or more through holes are at least generally found to have a rather complex and complicated construction.

Furthermore, these prior art molds usually comprise dies composed of two or more mutually separable parts, which involves a rather complex operation, particularly for displacement of these parts, with adverse effects on both mold fabrication and molding costs, as well as on the final cost of the finished bored glass article.

Embodiments of molds for glass articles, such as containers or glasses, are also known, which have a through hole or aperture formed through their walls, wherein the hole is formed, during molding, by a moving element in the area of the gap between the die and the plunger.

Particularly, during molding of the article, this element is placed in such position as to extend through the gap between the die and the plunger of the mold, to define a gap area corresponding to the through aperture or hole to be formed in the article, which does not receive or is not filled with the molten glass.

Then, this element is withdrawn from the gap, once the glass has solidified, to clear the hole and allow both die and plunger separation and removal of the bored glass article from the mold.

Nevertheless, this solution is also complex, in terms of both construction and operation, and still has drawbacks.

SUMMARY OF THE INVENTION

Therefore, the main object of the present invention is to provide a new and novel mold for fabricating and molding glass articles, typically containers such as salad bowls, trays or the like, having at least one aperture or through hole or bore formed in the thickness of their walls, wherein this new mold is associated with tangible improvements or advantages over known prior art molds, and particularly is simpler in both structure and operation, thereby involving lower molding costs and ensuring improved results in terms of quality of the final glass article with a bored configuration.

Furthermore, the second object of the invention, still associated with the first, is to expand the range and possibilities of molding glass products and articles having through holes or apertures in their walls, i.e. to increase the range and variety of shapes and configurations in which such bored products and articles may be molded.

A third object of the present invention is to both provide a manufacturing equipment and define a molding process allowing molding of glass articles with through holes or apertures or empty areas in their walls, at a lower cost and with an excellent quality.

Finally a fourth object of the present may be to promote marketing of glass products and articles having a characteristic bored shape, due to the lower costs and excellent quality of the final product.

These objects are fulfilled by the new mold for molding and fabricating glass articles with a bored configuration in their walls, and the corresponding molding process, having the features as defined in the independent claims 1 and 8 respectively.

Particular embodiments of the new mold for molding bored glass articles and the associated molding process are defined in the dependent claims.

Advantages of the Invention

A number of advantages, as partially implicitly mentioned above, are associated with the new mold of the present invention, which is designed for molding and forming glass articles having one or more through holes or apertures in their walls, such as those listed below, by way of example:
- superior quality of the molded glass article, with the areas of the through holes being totally free of defects, such as seams, that are often present in conventionally molded bored articles;
- reduced operating costs and, as a result, reduced costs for molding the bored glass article;
- high flexibility, with the ability of forming a variety of exterior shapes of glass articles and containers, having bored areas and apertures in their walls.

BRIEF DESCRIPTION OF THE DRAWINGS

These and other objects, features and advantages of the present invention will clearly and apparently result from the following description of a preferred embodiment, which is given by way of non-limiting example with reference to the annexed drawings, in which:

FIGS. 5A and 5B are a plan view, with certain parts omitted and a longitudinally sectional view, along the line V-B-V-B of FIG. 5A of the mold of the invention as shown in FIG. 4, respectively;

FIG. 5B' is an enlarged-scale view of the area outlined by a one-dot chain line circle of FIG. 5B;

FIGS. 7A-7H are perspective and orthogonal views of bored glass articles, molded by the one-piece die mold and the equipment of the invention, as viewed from different points of view;

Figure 1:
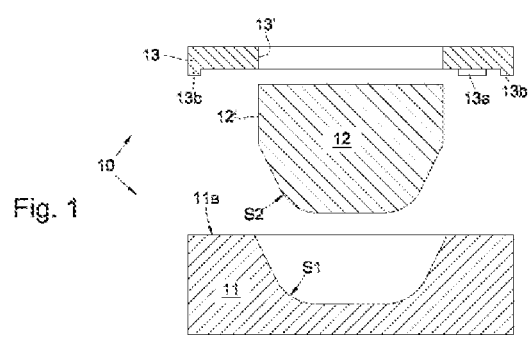
FIG. 1 is a diagrammatic sectional view of the essential parts of a mold of the present invention, in a separate configuration, for molding a glass container article, such as a salad bowl or a similar article. having a typical bored shape, with a through hole or bore.
Figure 2A:
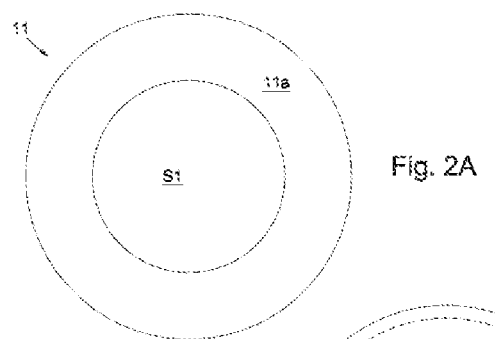
FIGS. 2A and 2B are diagrammatic plan views of a one-piece die and a closing ring for closing the mold of FIG. 1 respectively.
Figure 2B:
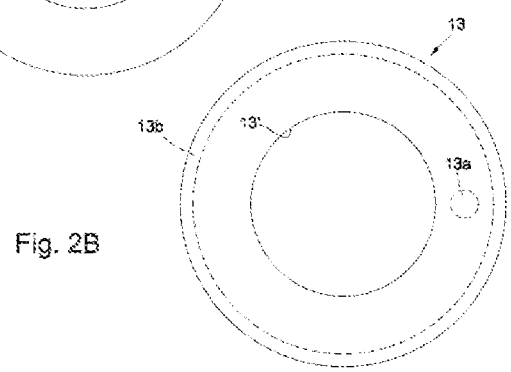

DESCRIPTION OF A PREFERRED EMBODIMENT OF THE INVENTIVE MOLD FOR MOLDING GLASS ARTICLES HAVING AT LEAST ONE THROUGH HOLE

Referring to the drawings, one mold of the present invention, for molding and forming glass articles, typically containers such as salad bowls, trays, general-purpose bows and similar articles or objects, having a shape and a configuration characterized by at least one through hole or bore, or generally an aperture formed through the thickness of the walls of the article, generally referenced 10.

FIGS. 1, 2A, 2B and 3 are diagrammatic views of the mold 10 of the present invention, showing its basic and essential concepts.

Namely, the mold 10 comprises three distinct separable parts, which are adapted to move relative to one another, as more clearly explained in the description and use of the mold 10, in which these three separable parts respectively consist of:
- a die 11, also called female member or matrix, having a surface S1 that defines the outer shape of the glass article or container, referenced A, to be molded,
- a plunger 12, also called male member, having a surface S2 that defines the outer shape of the glass article or container, referenced A, to be molded,
- a closing ring 13, wherein these three parts 11, 12, 13 are designed to close against one another into a closed configuration of the mold 10, in which the three parts 11, 12, 13 define the inner cavity of the mold 10 and hence the overall shape of the glass article A to be molded, which has a bored configuration.

Particularly, the closing ring 13 has an inner hole 13' that defines an inner surface, which is designed to mate and cooperate with a corresponding outer surface 12' defined by the plunger 12, in sealing fashion, i.e. preventing leakages of glass material, into the closed configuration of the mold 10, as better explained below.

According to a first basic feature of the present invention, the die 11 of the mold 10 has a monolithic construction, i.e. is composed of a single piece.

Also, according to a second basic feature of the present invention, at least one of the two parts consisting of the closing ring 13 and the one-piece die has a protruding portion corresponding to—and defining—the shape of the through hole or bore to be molded and formed in the glass container A.

For simplicity, the diagrammatic views of FIGS. 1, 2A, 2B and 3 only show a protruding portion, referenced 13a, formed on a bottom face of the closing ring 13.

Figures 8A, 8B:
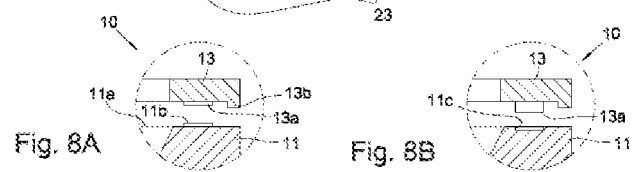
FIGS. 8A and 8B are diagrammatic views of certain variants of the pieces that form the mold of the invention.
Figure 9:
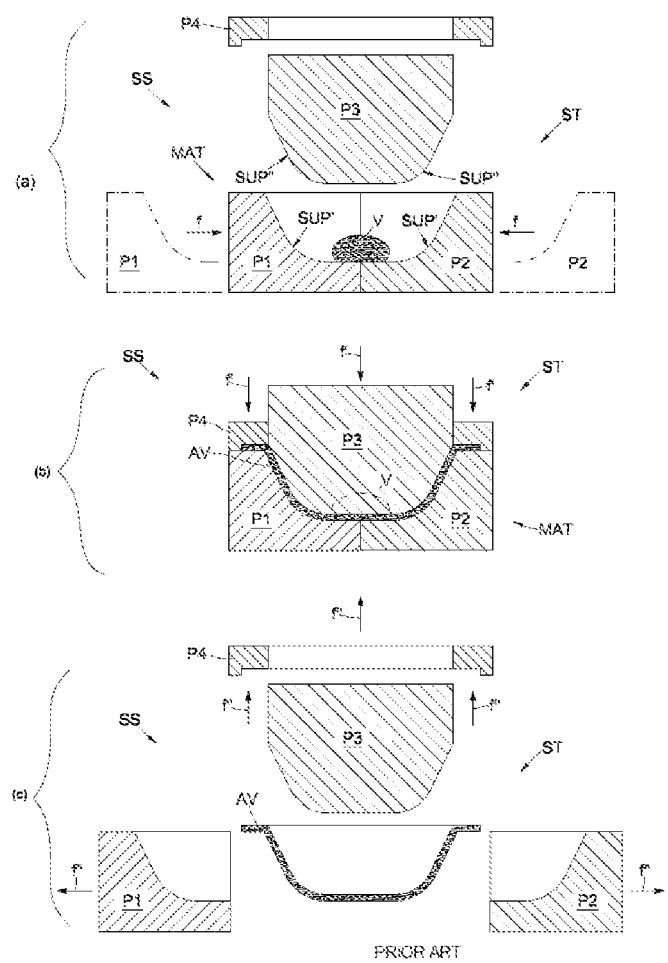
FIG. 9, divided into sections (a), (b), (c), shows diagrammatic views of the steps for molding a general glass container using a conventional mold.

Nevertheless, it shall be understood that, according to a first variant as shown in FIG. 8A, an identical protruding portion 11b may be also formed, alone or in combination with the portion 13a, on a top face 11a of the one-piece die 11.

Also, according to a further variant, as shown in FIG. 8B, the protruding portion of one of the two parts and 11, e.g. the protruding portion 13a of the closing ring 13 may be designed to cooperate with a corresponding recess 11c formed in the other part, i.e. the one-piece die 11, instead of a protruding portion or an outer surface of the latter, to define the shape of the through hole of the article to be molded.

Furthermore, at least one of the two parts consisting of the closing ring 13 and the one-piece die 11 has a protruding outer edge which has a sealing action to prevent leakage of the fluid glass material during molding of the bored glass article A, as better described below.

Here again, for simplicity, the diagrammatic views of FIGS. 1, 2A, 2B and 3 only show a protruding edge, referenced 13b, formed on the lower face of the closing ring 13, but an identical and/or complementary protruding edge may be also formed, alone or in combination with the protruding edge 13b, on the top face of the die 11.

Figure 3:
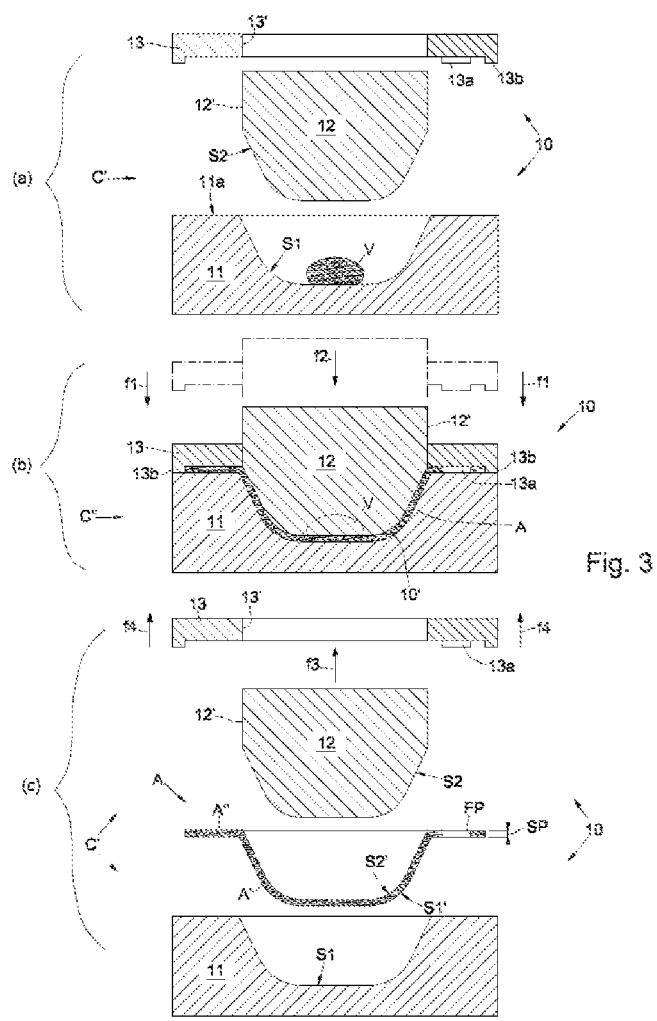
FIG. 3, which is divided into the sections (a), (b), (c) shows diagrammatic views of the steps for molding a glass container, such as a salad container or bowl, whose shape has a through hole or bore, using the mold of FIG. 1 according to the present invention.

The following will describe in greater detail, referring to FIG. 3, the use and operation of the mold 10 for molding a glass article A, having a schematic and general shape with a configuration having a through hole or bore, referenced FP, in the walls of the article A.

Particularly, the article A to be molded, which is in the form of a salad container or a bowl, has a main containing body, referenced A', which defines a convex outer surface S1', corresponding to a surface S1 of the die 11; an inner concave surface S2', corresponding to the surface S2 of the plunger 12; and an upper flat edge, referenced A", having a thickness SP, which laterally projects out of the periphery or outer edge of the containing body A' and has the through hole FP extending through its thickness SP.

At first, with the mold 10 in an open configuration, referenced C', in which the parts 11, 12 and 13 are spaced from one another, as shown in section (a) of FIG. 3, a molten or plastic or malleable glass gob V, is deposited in a well-known manner on the bottom of the inner surface S1 of the die 11.

Therefore, as shown by arrows f1 and f2 and outlined by a one-dot chain line, the plunger 12 and the closing ring 13 are moved to close upon the die 11, into a closed configuration C''' of the mold, as shown in section (b) of FIG. 2, in which the closing ring 13 contacts a top surface 11a of the die 11.

Particularly, the closing ring 13 is lowered first, as shown by arrows f1, such that its protruding portion 13a and its protruding edge 13b are laid upon the surface 11a of the die 11, and the plunger 12 is lowered next, as shown by arrow f2, to press the glass gob V deposited on the bottom of the die 12.

Therefore, the closing movement of the plunger 12 causes the glass gob V to expand in the gap between the die 11 and the plunger 12 and the fluid glass material of the gob V to fill the inner cavity, referenced 10', of the mold 10.

Thus, the glass material entirely fills the inner cavity 10' of the mold 10, and particularly the space around the protruding portion 13a, thereby forming the through hole FP, whereas the protruding edge 13b of the closing ring 13 has a sealing action and prevents leakage of the glass material that expands in the inner cavity 10'.

Then, as shown in section (c) of FIG. 3, and by arrows f3 and f4, after a given time required for solidification of the glass material that fills the cavity 10' of the mold 10, the plunger 12 and the closing ring 13 are withdrawn from the die 11, and the mold 10 resumes its open configuration C'.

Particularly, the plunger 12 is the first to lift away from the die 11, as shown by arrow f3, followed by the closing ring 13, which lifts away as shown by arrows f4.

Now, the article A, with the through hole FP in its edge A", may be removed from the mold 10 in a known manner.

Figure 4:
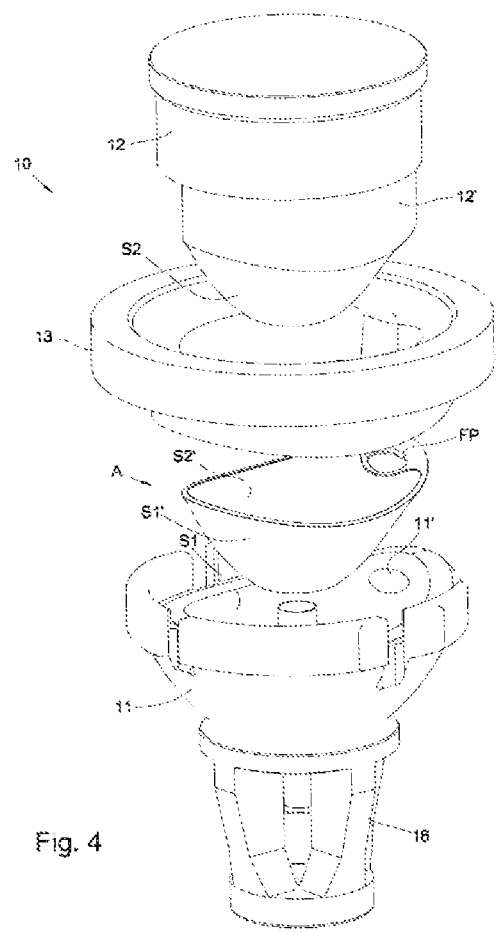
FIG. 4 is a perspective, comprehensive and more detailed view of the mold of the present invention, for molding a glass article whose shape has at least one through hole or bore.

FIGS. 4, 5A and 5B show the one-piece die mold 10 of the invention more accurately and less schematically than FIGS. 1, 2A, 2B and 3, with reference to a given actual shape of the article A.

Particularly, as shown in FIGS. 4 and 5B, the mold 10 extends along its center axis X and comprises, in addition to the parts 11, 12, and 13, a base 16 with the one-piece die 11 stably fixed thereon.

FIG. 5B', in turn, has the purpose of clearly showing certain special features and details of the mold 10 of the invention in the area in which the through hole FP of the article A is formed, with the mold 10 in its closed configuration.

As shown in FIG. 5B', the glass article or container A, which is molded by the mold 10 of FIGS. 5A and 5B, has a wall, in which the through hole FP is formed, which is inclined with respect to the center axis X of the mold 10.

In the area of the mold 10 corresponding to formation of this through hole FP, the closing ring 13 has a protruding area or portion 13', corresponding to the above described portion 13a, and the one-piece die 11 also has a protruding area or portion 11', wherein these two protruding portions 13' and 11' are designed to close upon each other along a contact surface 15, when the mold 10 is closed to form the article A, as described above.

As clearly shown in FIG. 5B', the two protruding portions 13' and 11' and the contact surface 15 that separates these two portions 13' and 11' in the area of the through hole FP, when the mold 10 is closed, are appropriately configured, particularly considering the inclination of the wall of the article A in which this hole FP is formed, with respect to the axis X, to avoid undercuts and allow proper forming of the hole FP, when the mold 10 is open, i.e. the closing ring 13 is withdrawn from the die 11, as shown by an arrow fr.

Also, in the area of the through hole FP, while the plunger 12 defines an outer surface 12' extending parallel to the axis X of the mold 10, and of the plunger 12 itself, the inner surface of the hole 13' defined by the closing ring 13 has some inclination with respect to such axis X, thereby defining a rake angle, referenced $\alpha$, between the plunger 12 and the closing ring 13.

This rake angle $\alpha$ has the purpose of facilitating coupling of the plunger 12 and the closing ring 13, while ensuring a sealing effect between such parts, in the area of the through hole FP, to prevent any leakage and release of the glass material during molding of the bored article A.

Obviously, such rake angle α between the plunger 12 and the closing ring 13, which has the purpose, as mentioned above, to facilitate optimal hermetic coupling between the plunger 12 and the closing ring 13, particularly in the area of the through hole FP, may be obtained by inclining either of these parts 12 and 13, or both, with respect to the center axis X of the mold 10.

Therefore, it will be appreciated that this mold 10 and the corresponding molding process fully fulfill the intended objects, and particularly provide a simple and relatively inexpensive manner to obtain a superior-quality glass article, typically in the form of a container or a salad bowl, having one or more through apertures or holes along its edges or generally through the thickness of its walls, thereby obviating the prior art drawbacks that hindered or prevented easy molding of this type of glass articles having a shape with one or more holes.

Valiant Embodiments

Of course, subject to the principle and basic concepts of the present invention, the embodiments and details of the mold as described heretofore, for molding glass articles having a configuration with at least one through hole or bore, may be extensively changed with respect to the above description and figures, without departure from the scope of the invention.

For instance, both the closing ring and the one-piece die may have a plurality of protruding portions like the one described above with reference to the embodiments 10, each corresponding to a hole to be formed in the thickness of the glass article to be molded.

Also, the shapes of the plunger, the closing ring and the one-piece die, as well as the shapes of the protruding area and portions formed on the closing ring and the one-piece die and corresponding to the through holes to be formed in the glass article, may change according to the particular shape of either the article to be molded or the area of the article in which the through holes have to be formed.

Manufacturing Equipment Incorporating the One-Piece Die Mold of the Invention

Figure 6A:
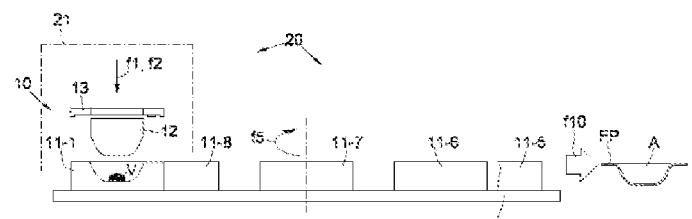
FIGS. 6A and 6B are two diagrams illustrating a molding equipment including and integrating the mold of the invention, for molding a glass article having at least one through hole.
Figure 6B:
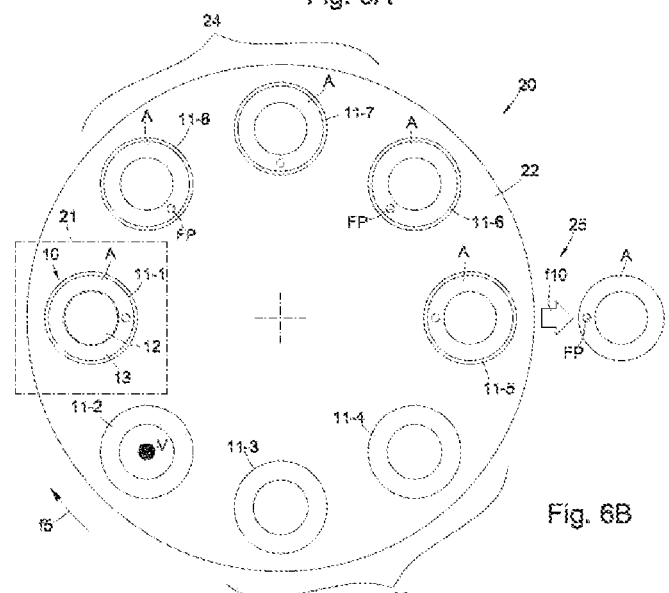

As a complement to the above, the following will describe, with reference to FIGS. 6A and 6B, a manufacturing equipment, generally referenced 20 and corresponding to a further aspect of the invention, which comprises and incorporates the above described inventive mold 10 for molding bored glass articles.

Particularly, the manufacturing equipment 20 comprises:
a molding station, referenced 21 and corresponding to the above described one-piece die mold 10 of the invention 10, and
a rotating platform 22, carrying a plurality of one-piece dies, which are preferably but without limitation identical, for example eight dies referenced 11-1, 11-2, 11-3, . . . 11-8, and defining the outer shape of the bored glass article to be molded.

The molding station 21 comprises in turn:
a plunger 12 shared by such plurality of one-piece dies carried by the rotating platform 22 and defining the inner shape of the glass article to be molded; and
a closing ring 13 shared by the plurality of one-piece dies carried by the rotating platform 22.

In operation, the rotating platform 22 intermittently rotates by a given angle, as shown by an arrow f5, such that each of the dies 11-1, 11-2, 11-3, . . . 11-8, carried by the platform 22 is successively moved through a series of workstations, which are in turn designed to perform processing thereon to obtain the final glass article A.

Particularly, during intermittent rotation of the platform 22, the one-piece dies are initially moved through a series of stations, in a preparation area referenced 23 in which the dies are appropriately designed and prepared to receive a glass gob V.

Then, when any one of these one-piece dies is carried by the intermittent rotation of the platform 22 to the station that precedes the molding station 21 and stops therein, a fluid glass gob V is delivered to the one-piece die.

Then, by subsequent rotation of the platform 22, a one-piece die, for instance the die 11-1, as shown in FIGS. 6A and 6B, which received the glass gob V, is carried into the area of the molding station 21 where the one-piece die 11-1 receives first the closing ring 13 and then the plunger 12, to close the mold 10 and accordingly press the glass gob V and form the glass article A, which has the through hole FP.

Afterwards, by subsequent rotation of the platform 22, the bored article A is removed from the molding station 21 and carried into a subsequent station.

At the same time, the one-piece die 11-8 that follows the die 11-1 on the platform 22 and contains a glass gob V, is carried into the molding station 21, instead of the die 11-1, to receive the closing ring 13 and the plunger 12 and thus form another bored glass article A.

This cycle is repeated at each angular rotation of the platform 22.

Once the articles A have been molded in the molding station 21, they are moved by intermittent rotation of the platform 22 through a plurality of stations located in a cooling area referenced 24 and are finally moved into a removal station 25, where the finished articles A are removed from their respective dies and the platform 22, as shown by an arrow f10.

For the sake of completeness, the perspective views of FIGS. 7A-7F show some bored glass articles, referenced A1 and A2, with their respective holes referenced A1' and A2', molded by the one-piece mold 10 and the equipment 20 of the invention, from various points of view.

It will be appreciated that the articles may have one or more holes in their walls, particularly along their upper edge.

Furthermore, to confirm that the mold of the invention is adapted to mold glass articles with any number of holes, FIGS. 7G and 7H show plan and sectional views of an article A3, in the form of a container, that has a plurality of apertures A3' formed and arranged over the entire extension of its upper edge.

What is claimed is:

1. A mold (10) for molding glass articles (A, A1, A2, A3), particularly containers such as salad containers, bowls or the like, which are bored through, that is have a shape with at least one through hole or bore (FP, A1', A2', A3') formed through the walls or thickness of the glass article, comprising:
three distinct and separable parts (11, 12, 13) that is:
a die (11) defining the outer shape of the glass container to be molded,
a plunger (12) defining the inner shape of the glass container to be molded, and
a closing ring (13),
wherein said die (11) is adapted to receive a glass gob (V) in a plastic or molten state, and said three parts (11, 12, 13) are designed to be pressed onto one another to close the mold (10), and hence cause pressing and expansion of the molten glass gob (V) in the cavity (10') of the mold and to mold and form the glass article or container (A),
wherein said die (11) has a monolithic construction, composed of one piece, and
wherein at least one of said closing ring (13) and said one-piece die (11) has a protruding portion (13a, 13', 11') defining the shape of the through hole or bore (FT) to be molded and formed in the glass container (A).

2. A mold (10) for molding bored glass articles (A, A1, A2, A3) as claimed in claim 1, wherein at least one of said closing ring (13) and said one-piece die (11) has a protruding outer edge (13b) for sealing the fluid glass material in the mold, when the latter is closed.

3. A mold (10) for molding bored glass articles (A, A1 A2, A3) as claimed in claim 1, wherein, as the mold is closed, the closing ring (13) closes upon the one-piece die (11) before the plunger (12) and wherein, as the mold is closed, the plunger (12) moves away from the one-piece die (11) before the closing ring (13).

4. A mold (10) for molding bored glass articles (A, A1, A2, A3) as claimed in claim 1, wherein said plunger (12) and said closing ring (13) form a rake angle (α) between the outer surface (12') of said plunger (12) and the inner surface of the hole (13') defined by said closing ring (13), to facilitate coupling between said plunger (12) and said closing ring (13), particularly in the area of said through hole (FP) in the closed configuration of the mold.

5. A mold for molding bored glass articles (A3) as claimed in claim 1, wherein at least one of said closing ring and said one-piece die has a plurality of protruding portions which define the shape of a corresponding plurality of through holes or bores (A3') to be molded and formed in the glass article (A3).

6. A mold (10) for molding bored glass articles (A, A1, A2, A3) as claimed in claim 1, wherein both said closing ring (13) and said one-piece die (11) have respective protruding portions (13', 11') which are adapted to close upon each other to define the shape of the through hole (FP) of the article to be molded.

7. A mold (10) for molding bored glass articles (A, A1, A2, A3) as claimed in claim 6, wherein the glass article (A) to be molded has a wall, with the through hole (FP) formed therein, which is inclined with respect to a center axis (X) of the mold, and wherein the protruding portions (13', 11') on said closing ring (13) and said one-piece die (11) are configured to avoid undercuts, and allow proper demolding of the through hole (FP) as the mold is opened.

8. A process for molding glass articles (A) having a shape with at least one through hole or bore (FP), comprising the steps of:
   providing a mold (10) composed of three distinct and separable parts (11, 12, 13), that is a one-die die (11), a plunger (12), and a closing ring (13), at least one of the closing ring (13) and the one-piece die (11) having a protruding portion (13a, 13, 11') that defines the shape of the through hole (FP) of the glass article (A) to be molded;
   depositing a molten glass gob (V) in the one-piece die (11) of the mold (10);
   closing the plunger (12) and the closing ring (13) with its protruding portion (13a, 13', 11') against the one-piece die (11), to close the mold, whereby, upon closure of the mold, the molten glass gob (V) expands in the cavity (10') of the mold defined by the one-piece die, the plunger and the closing ring, to form the article (A) with the through hole (FP).

9. A manufacturing equipment (20) for molding glass articles (A), particularly containers such as salad containers, bowls or the like, which are bored through, that is have a shape with at least one through hole or bore (FP) formed through the walls or thickness of the glass article, comprising:
   a molding station (21) corresponding to a mold (10) as claimed in claim 1, and
   a rotating platform (22), carrying a plurality of one-piece dies (11-1, 11-2, 11-3), which are particularly identical, defining the outer shape of the bored glass article (A) to be molded,
   wherein said molding station (21) in turn comprises:
      a plunger (12) shared by said plurality of one-piece dies (11-1, 11-2, 11-3), carried by said rotating platform (22) and defining the inner shape of the glass article to be molded, and
      a closing ring (13) shared by said plurality of one-piece dies carried by said rotating platform (22), wherein said rotating platform (22) is adapted to intermittently rotate to successively move the dies carried by the same platform into the area of said molding station (21), and
   wherein, when each of said one-piece dies (11-1, 11-2, 11-3) carried by the rotating platform (22) is moved into the area of said molding station (21), the closing ring (13) and the plunger (12) of the molding station 21) close upon the one-piece die (11-1) for pressing and expanding a molten glass gob (V) previously deposited in the one-piece die, and hence molding and forming the glass article (A).

* * * * *